(12) United States Patent
Matthews et al.

(10) Patent No.: US 7,966,816 B1
(45) Date of Patent: Jun. 28, 2011

(54) TURBOCHARGED INTERNAL COMBUSTION ENGINE

(75) Inventors: Patrick Matthews, West Bloomfield, MI (US); David Krenk, Canton, MI (US); Christopher William Newman, Farmington Hills, MI (US); Fadi Maroun Naddaf, Macomb Township, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/685,136

(22) Filed: Jan. 11, 2010

(51) Int. Cl.
*F02B 33/44* (2006.01)
*F02B 33/00* (2006.01)
*F02B 37/00* (2006.01)
*F02B 37/10* (2006.01)
*F01D 3/02* (2006.01)

(52) U.S. Cl. ............. 60/612; 123/562; 415/93; 415/97; 415/98

(58) Field of Classification Search ............ 60/597–612; 123/562, 559.1; 415/98, 97, 93
See application file for complete search history.

(56) References Cited

U.S. PATENT DOCUMENTS

| | | | | |
|---|---|---|---|---|
| 2,359,615 | A * | 10/1944 | Browne et al. | 60/612 |
| 3,673,798 | A * | 7/1972 | Kuehl | 60/605.1 |
| 4,594,668 | A * | 6/1986 | Fujawa et al. | 701/100 |
| 6,079,394 | A * | 6/2000 | Abthoff et al. | 123/559.1 |
| 6,256,990 | B1 * | 7/2001 | Itoh | 60/597 |
| 6,305,168 | B1 * | 10/2001 | Furukawa | 60/605.1 |
| 6,378,309 | B1 * | 4/2002 | Divecha et al. | 60/612 |
| 7,043,915 | B2 * | 5/2006 | Anello | 60/605.3 |
| 7,089,737 | B2 * | 8/2006 | Claus | 60/605.1 |
| 7,444,815 | B2 | 11/2008 | Baumgard et al. | |
| 7,810,466 | B2 * | 10/2010 | Preimesberger et al. | 123/195 A |
| 7,895,992 | B2 * | 3/2011 | Diggs et al. | 123/559.1 |
| 2003/0159442 | A1 | 8/2003 | Huter et al. | |
| 2005/0144946 | A1 * | 7/2005 | Claus | 60/605.1 |
| 2007/0056281 | A1 * | 3/2007 | Arvan et al. | 60/598 |
| 2010/0180592 | A1 * | 7/2010 | Williams et al. | 60/602 |
| 2010/0229551 | A1 * | 9/2010 | Wu et al. | 60/605.1 |

FOREIGN PATENT DOCUMENTS

| | | |
|---|---|---|
| DE | 19822874 A1 * | 11/1999 |
| EP | 1382816 A2 | 1/2004 |
| EP | 2050940 A1 | 4/2009 |
| JP | 55054633 A * | 4/1980 |
| WO | 2006123093 A1 | 11/2006 |

* cited by examiner

*Primary Examiner* — Thai Ba Trieu
(74) *Attorney, Agent, or Firm* — Jerome R. Drouillard; Julia Voutyras

(57) ABSTRACT

An internal combustion engine includes a number of power cylinders furnishing exhaust gases to at least two turbochargers having a common air inlet housing which is divided into a separate compressor housing for each of the turbochargers.

1 Claim, 2 Drawing Sheets

TURBOCHARGED INTERNAL COMBUSTION ENGINE

BACKGROUND OF THE DISCLOSURE

1. Field of the Disclosure

The present disclosure relates to an internal combustion engine having multiple turbochargers fed from a common air inlet housing.

2. Related Art

Turbocharging has grown increasingly important in automotive engineering, due to the ability of turbocharging to increase the specific power output of engines without appreciably increasing weight and package volume. Maximum flexibility for turbocharging, however, does require that turbocharger size be as small as is practicable, to assure that the turbocharger responds promptly to increases in engine load. In turn, this has led to the use of multiple turbochargers with a single engine. Of course, the packaging of multiple turbochargers is a daunting task because of the need to route exhaust as well as intake air flows to and from the turbochargers.

It would be desirable to provide a dual turbocharging system which is more compact, so as to allow easier mounting of two turbochargers in a central location upon an engine, such as atop a V-block engine.

SUMMARY OF THE DISCLOSURE

According to an aspect of the present disclosure, an internal combustion engine includes a number of power cylinders, and a number of turbochargers receiving exhaust gases from the power cylinders. The turbochargers are connected with a common air inlet housing. According to a preferred embodiment of the present disclosure, two turbochargers have a single, bifurcated compressor housing which is one-piece with a common air inlet housing. The compressor housing is preferably configured so as to locate two compressors of the turbochargers coaxially.

According to another aspect of the present disclosure, at least two turbochargers are preferably mounted between the cylinder banks of a V-block engine, with a separate exhaust turbine for each of the turbochargers, and with the turbochargers' exhaust turbines being supplied with exhaust gases originating from an inboard side of at least one of the engine's cylinder banks. The turbochargers are preferably coaxial, with the axis of the turbochargers extending generally parallel to a crankshaft axis of the engine. The exhaust turbines are preferably located fore and aft from the turbochargers' compressor housings.

It is an advantage of a turbocharging system according to the present disclosure that a bifurcated compressor housing, having a separate branch for each of the turbochargers, saves precious space in the crowded confines of an engine compartment, particularly of an automotive vehicle.

It is yet another advantage of a turbocharger system according to the present disclosure that the present system facilitates mounting of twin turbochargers atop a V-block engine, so as to reduce the overall package volume, or in other words, the physical space required of the turbocharging system.

It is yet another advantage of the present turbocharger system that the exhaust turbines are readily fed exhaust gases from exhaust ports located on the inboard side of an engine's cylinder heads.

It is yet another advantage of the present turbocharger system that the requirement for separate air supply connections and interconnecting ducts and hardware usually needed to service twin turbochargers on an engine, is eliminated.

Other advantages, as well as features of the present system, will become apparent to the reader of this specification.

DETAILED DESCRIPTION OF THE PREFERRED EMBODIMENTS

Figure 1:
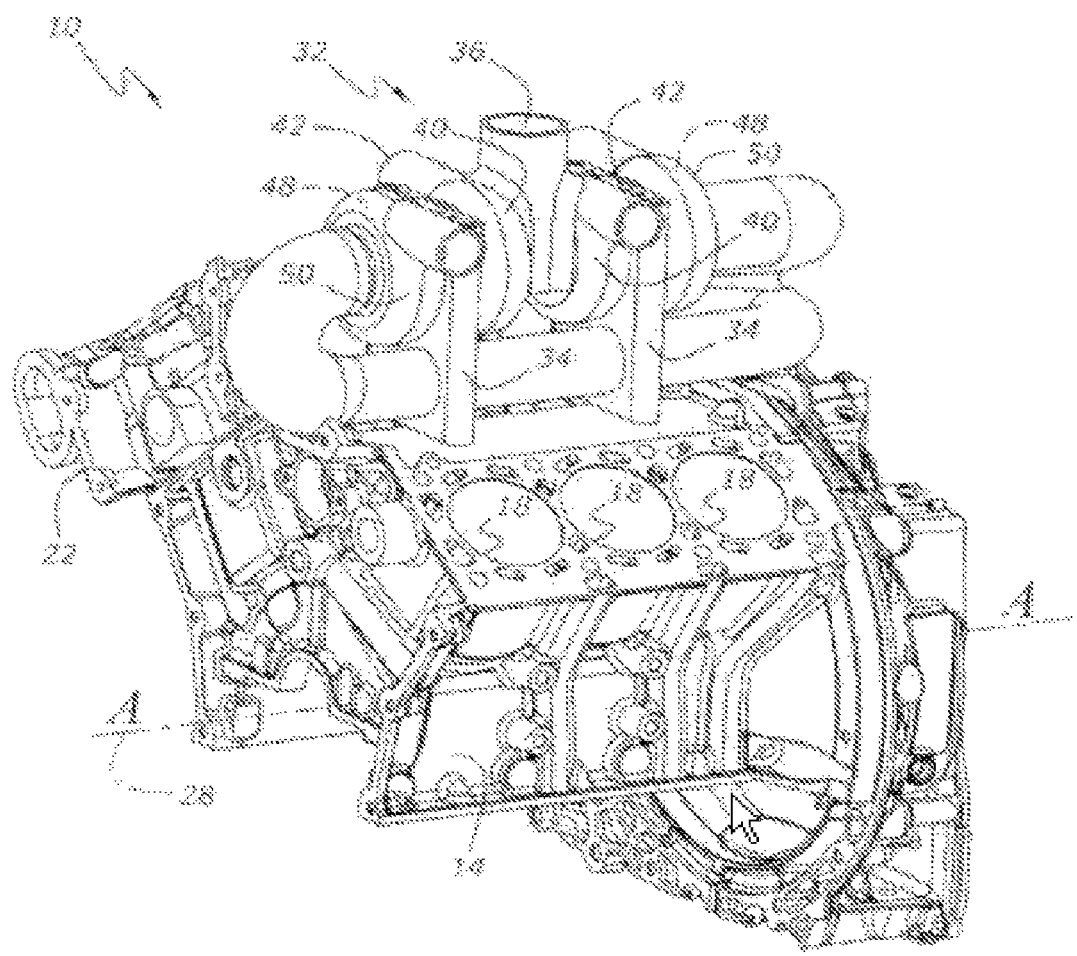
FIG. 1 is a partially schematic perspective view of an engine having a turbocharging system according to an aspect of the present disclosure.

As shown in FIG. 1, engine 10 has a V-type cylinder block, 14, with a number of power cylinders, 18. Those skilled in the art will appreciate in view of this disclosure that an engines with other numbers of cylinders could employ a turbocharger system according to the present disclosure. Moreover, the present turbocharging system is equally useful with both V-block and inline type engines, as well as flat or "pancake" type engines.

Engine 10 is illustrated in FIG. 1 as having but one cylinder head, 22, installed, with the understanding that a second cylinder head has been removed as an aid to viewing the turbocharging hardware incorporated within engine 10.

Engine 10 has a crankshaft axis 28, with the axis of the turbocharger system being generally parallel thereto.

Turbocharger assembly 32 is mounted upon pedestals 34 to cylinder block 14. Turbocharger assembly 32 includes a single air inlet housing 36, which is bifurcated into two branched compressor housings, 40, it being understood that air inlet housing 36 and compressor housings 40 are one piece and ideally formed as a single casting. Each of compressor housings 40 contains a single compressor, 38 (FIG. 2).

Figure 2:
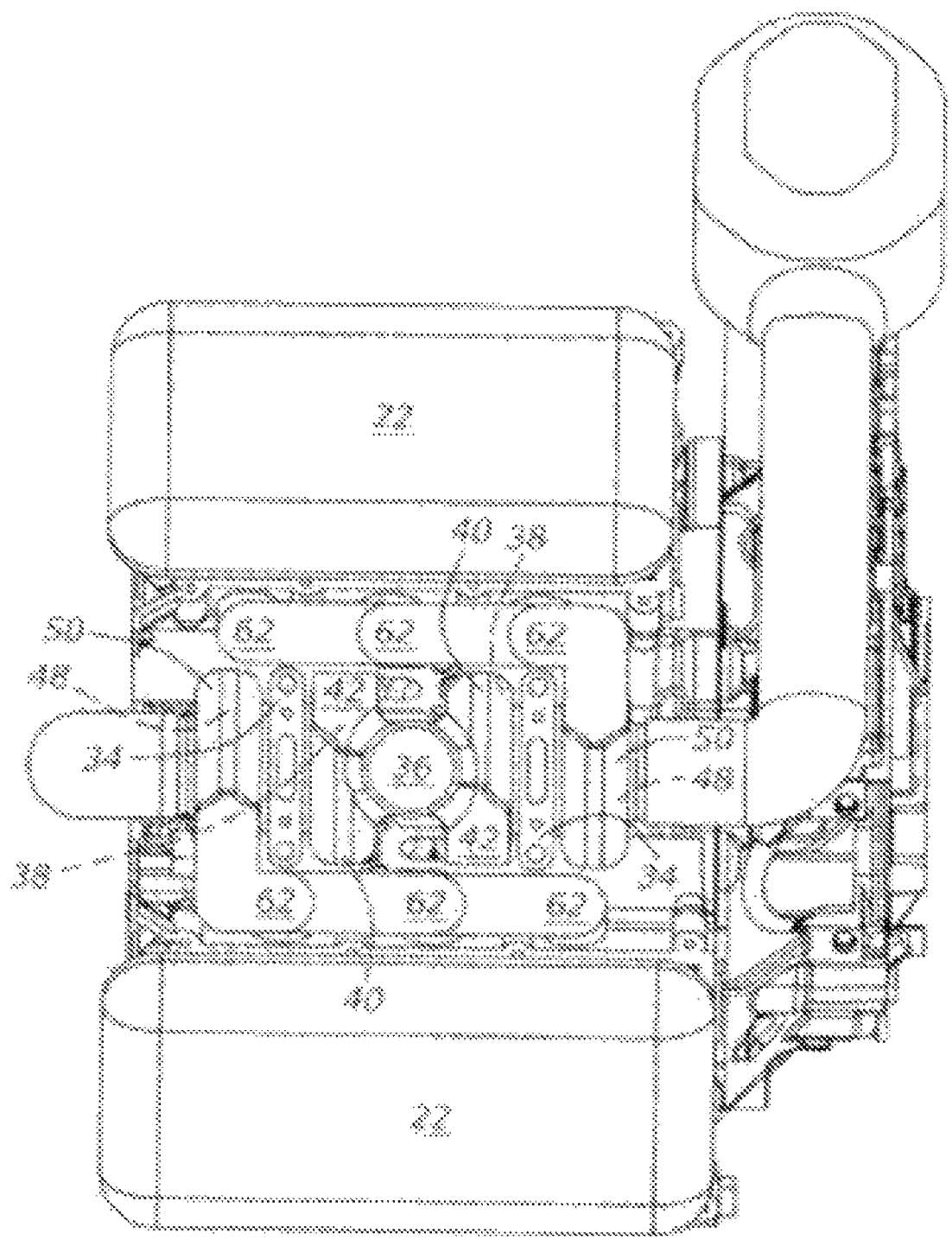
FIG. 2 is a plan view of an engine having a turbocharger system according to an aspect of the present disclosure.

Compressor housings 40 have compressor outlets, 42, both of which are shown in FIGS. 1 and 2. As noted above, there are two separate turbochargers, joined with a common air inlet housing 36, which bifurcates into two compressor housings 40. The turbochargers are mounted by pedestals 34 to cylinder block 14. The turbochargers also include exhaust turbines, 48, which are mounted within turbine housings 50. It should be noted that although the turbochargers are coaxial, there is no shaft interconnecting the two turbochargers; they are free to rotate independently.

Exhaust turbines 48 are furnished with exhaust gases by exhaust supply manifolds 62, which are shown in FIG. 2. Exhaust supply manifolds 62 are advantageously located on inboard sides of the engine's cylinder banks, and receive gases from cylinder heads 22. As further shown in FIG. 2, the turbochargers' exhaust turbine housings 50 and their turbines, 48, are located fore and aft from compressor housings 40.

The foregoing system has been described in accordance with the relevant legal standards, thus the description is exemplary rather than limiting in nature. Variations and modifications to the disclosed embodiments may become apparent to those skilled in the art and fall within the scope of the disclosure. Accordingly, the scope of legal protection can only be determined by studying the following claims.

What is claimed is:

1. A v-block internal combustion engine, comprising:
a plurality of power cylinders; and
two turbochargers receiving exhaust gases from said power cylinders, with said turbochargers having a common central axis which is generally parallel to the crankshaft axis of the engine, and with the turbochargers comprising:
- a one-piece, centrally located, common air inlet housing for said turbochargers, with said common air inlet housing being bifurcated into separate branches connected to a compressor housing for each of said turbochargers; and
- a separate exhaust turbine for each turbocharger, with said exhaust turbines being located outboard from said compressor housings at locations fore and aft from said compressor housings, with said exhaust turbines being supplied with exhaust gases from inboard sides of separate cylinder banks, and with exhaust being conducted from at least one of said exhaust turbines through a duct positioned between a lower portion of said turbochargers and an upper portion of the cylinder block of the engine.

* * * * *